No. 873,783.
PATENTED DEC. 17, 1907.
R. C. RANDALL.
ANIMAL TRAP.
APPLICATION FILED MAY 3, 1907.
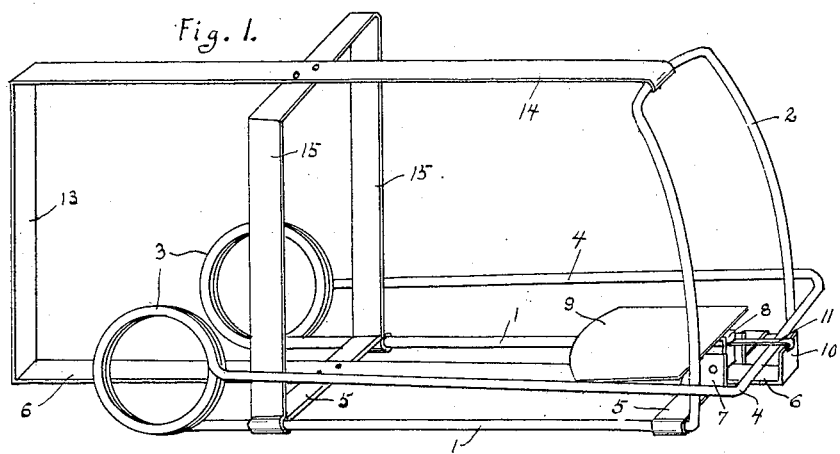
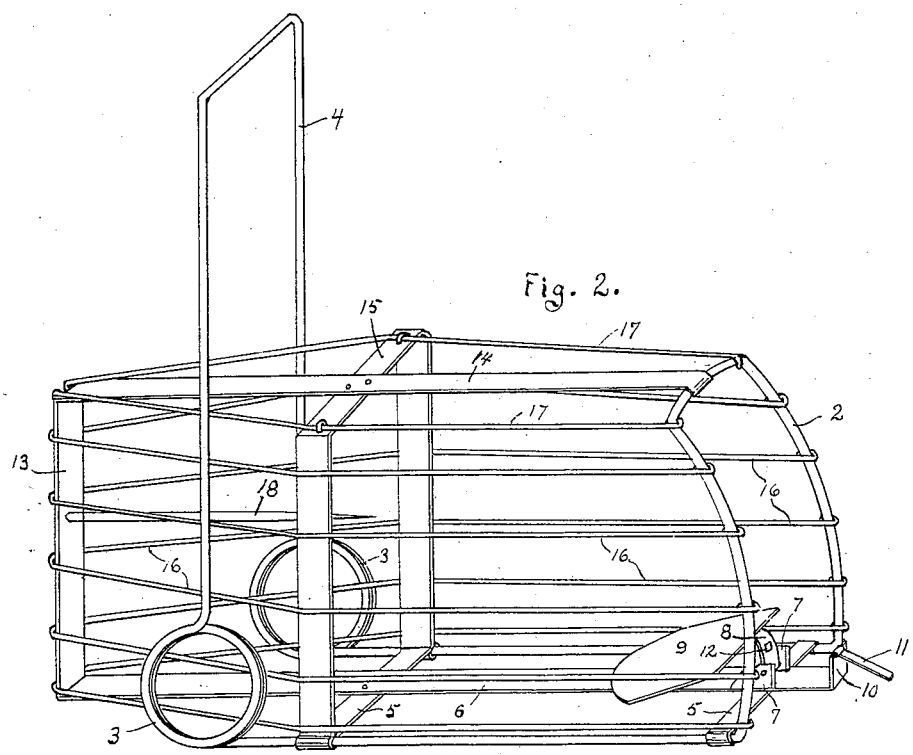
Witnesses
Millard Haskell.
D L Weaver
Inventor
Roy C. Randall,
By Walter N. Haskell,
his Attorney

UNITED STATES PATENT OFFICE.

ROY C. RANDALL, OF KIRKWOOD, ILLINOIS.

ANIMAL-TRAP.

No. 873,783.  Specification of Letters Patent.  Patented Dec. 17, 1907.

Application filed May 3, 1907. Serial No. 371,731.

*To all whom it may concern:*

Be it known that I, ROY C. RANDALL, a citizen of the United States, residing at Kirkwood, in the county of Warren and State of Illinois, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to animal traps, and is more specially designed to be used in the capture of fur-bearing animals which are caught for the purpose of obtaining their skins. The construction and operation of the parts thereof will be more fully set forth in the following specification and claims.

In the drawings: Figure 1 is a perspective view of the main part of the trap and supporting frame thereof, with the trap set. Fig. 2 is a similar view, with the trap sprung, and partly inclosed with a wire net-work.

Similar numbers refer to similar parts in both figures.

The trap consists primarily of a pair of side-pieces 1 1; an arch or loop 2 uniting the front ends thereof, a pair of coiled springs 3 3 on the rear ends of the side-pieces, and a loop 4 actuated by the springs 3. The side-bars 1, arch 2, springs 3 and loop 4 are integral, and are preferably formed of a wire or rod of suitable strength and temper. The side pieces of the loop 2 form arcs of a circle, and are concentric with the springs 3, the tension of which is such as to tend to hold the loop 4 in vertical position, as shown in Fig. 2. The side arms of the loop 4 are projected from the outer coils of the springs 3, giving to such loop a greater width than that of the loop 2, and the length of the loop 4 is sufficient to enable such loop to be passed downwardly over the arch 2, into the position shown in Fig. 1.

The side-pieces 1 are held in position by a pair of cross-pieces 5 5, and a bar 6, extending centrally of the trap, is secured to such cross-pieces. Near the forward end of the bar 6 is a pair of ears 7 7, between which is pivoted a tongue 8, to which is attached a plate 9. The forward end of the bar 6 is bent upwardly to form a support 10 for a trigger 11, which is hingeably supported thereon. The free end of the trigger 11 is adapted to be held in an opening 12 in the tongue 8, when the plate 9 is in horizontal position, as shown in Fig. 1, and when the trap is set the upper bar of the loop 4 is held beneath the trigger 11, and such trigger engaged by the tongue 8, as mentioned.

It is desired to have the animal enter the arch from the forward side thereof, and to compel it to do so the trap is partially inclosed in the following manner. Integral with the bar 6 at the rear end thereof is a support 13, bent forwardly into a bar 14, the forward end of which is attached to the top of the arch 2. Supported on the ends of the rear cross-piece 5 is an arch 15, intersecting the bar 14, and preferably secured thereto. A series of bars or wires 16 is attached to one side of the arch 2, and extends rearwardly around one side of the arch 15, around the support 13, and forwardly on the opposite side of the arch 15 to the other side of the arch 2. The upper part of the trap is similarly inclosed by bars 17.

Fixed at the rear of the trap is a spike 18 to which the bait may be attached, or such bait can be placed in any other part of the trap where the animal would be compelled to enter the arch 2 in order to get at it.

In operation, as the animal enters the trap it steps upon the plate 9, or other wise disturbs it, to force such plate downwardly and release the trigger 11 and loop 4. Such loop thereupon flies upwardly, catching the animal between the upper bar of such loop and the upper part of the arch 2. The death of the animal is thereby accomplished, and without mutilating or in any way injuring the fur or skin thereof.

It will be obvious that while the device is strongly made it is simple in construction, and by reason of the operating loops and connecting parts being formed in one piece, as shown, the cost of production is considerably reduced.

What I claim as my invention, and desire to secure by Letters Patent of the United States, is:

1. An animal trap, comprising an arch 2; side-pieces 1, integral therewith; springs 3, integral with the side-pieces 1; a loop 4, integral with the springs 3; cross-pieces 5, uniting the side-pieces 1; a bar 6, secured to the cross-pieces 5, and provided at its forward end with a support 10; a trigger 11, pivotally mounted on the support 10; a tongue 8, pivotally supported on the bar 6, and adapted to engage the trigger 11, to hold the loop 4 in depressed position; and a plate 9, fixed to the upper end of the tongue 8, substantially as shown and described.

2. An animal trap, comprising an arch 2; side-pieces 1, attached thereto; springs 3, integral with the side-pieces 1; a loop 4, integral with the springs 3; cross-pieces 5, uniting the side-pieces 1; a bar 6, secured to the cross-pieces 5; a support 13, fixed on the bar 6, at the rear end thereof; a bar 14, integral with the support 13 at its rear end, and attached to the arch 2 at its forward end; an arch 15, supported on the rear cross-piece 5; a plurality of spaced-apart bars, inclosing the sides and top of the trap; means for holding the loop 4 in lowered position, with the trap set; and means for releasing such loop, substantially as shown and for the purpose mentioned.

In testimony whereof, I affix my signature in presence of two witnesses.

ROY C. RANDALL.

Witnesses:
  A. C. RANDALL,
  GEORGE H. BEEBE.